March 31, 1970     J. I. R. FRIBERG     3,503,289

DEVICE FOR CUTTING A CONTINUOUS STRIP FROM AN ELONGATED SHEET

Filed May 8, 1967

INVENTOR:
JOHN INGE RONNIE FRIBERG
BY:    Malk & Malk
ATTORNEYS

United States Patent Office 3,503,289
Patented Mar. 31, 1970

3,503,289
DEVICE FOR CUTTING A CONTINUOUS STRIP FROM AN ELONGATED SHEET
John Inge Ronnie Friberg, Gislaved, Sweden, assignor to N.V. Veluwse Machine Industrie, Epe, Netherlands
Filed May 8, 1967, Ser. No. 636,774
Claims priority, application Sweden, May 18, 1966, 6,893/66
Int. Cl. B29h 7/18; B26d 3/12, 1/38
U.S. Cl. 83—1       7 Claims

ABSTRACT OF THE DISCLOSURE

A device for obtaining a narrow strip from an elongated sheet which has a pair of opposed longitudinal side edges. The sheet is longitudinally fed, by a suitable feeding means, in the direction of its side edges. Then the sheet is cut transversely by a cutting means which coacts with the feeding means for cutting transversely across the sheet first from one of its side edges to the region of the other of its side edges and then from this other side edge back to the region of the one side edge after the sheet has been fed by the feeding means through a given increment which will determine the width of the strip. These operations are cyclically repeated so that a continuous elongated strip is obtained in this way from the sheet.

---

The present invention refers to a method and device for producing a continuous strip out of a rubber blanket or similar material. This invention is particularly intended to be used within the rubber industry for feeding material into an extruder.

The purpose is to form, from a fed blanket, a strip which can be continuously forwarded for further treatment, e.g., continuous feeding into a cold feeding extruder.

Hitherto, the rubber industry has proceeded in such way that the rubber blanket was cut into pieces of strips which were rolled up on bobbins and reserved in order later to be fed into an extruder. This procedure of treating the blanket requires much time and is costly. The present invention allows the blanket to be transported directly next to the extruder where it is cut into a continuous strip which is immediately fed into the extruder. The characteristics of the invention are described in the following patent claims.

In connection with the sketches attached hereto a way of executing the invention will be described.

Figure 3:
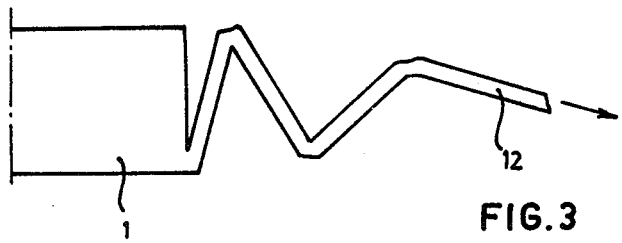
FIG. 3 shows how the blanket is cut by the machine.

The blanket or sheet 1 is forwarded over an endless conveyor belt 2 towards a cushion or stationary cutting blade 3. The conveyor belt 2 forms a feeding means and rolls around two rollers 4 and 5 of which the one 5 is driven in a stepwise manner with an adjustable angle of rotation so that the increment through which the sheet is fed at each angular turning of the rollers 4 and 5 can be predetermined so as to determine in this way the width of the strip. Over the belt a hold roll 6 rotates independently, holding the contact with the blanket. A rotating knife 7 is working against cushion 3 and forms a cutting means therewith. The rotating knife 7 consists of a shaft 8 with two edges or cutting blades 9 and 10 arranged diametrically opposite each other. The edges 9 and 10 are arched part of a sinus arch, and the ends are parallel to the shaft or axis of the rotating knife 8. The edges reach from the opposite ends of shaft 8 ending a small distance from each other ends. The shaft 8 corresponds to the width of the blanket, so one blade cuts inwardly from and extends transversely with respect to the direction of feed at one side of the sheet, ending a small distance from the other side, while the other blade correspondingly cuts from the other side, ending a small distance from the one side. The rotating knife is driven by the motor 11. When one blade 9 has completed its cutting, the feed means 2, 4–6 feeds the blanket towards the stationary blade through an increment as long as the desired width of the strip, and the other edge 10 starts cutting from the longitudinal side near which the first blade has finished its cutting. As it is produced the strip 12 may then be taken off the blanket 3, see FIG. 3. Then the strip 12 is forwarded to the cold feeding extruder 13 via the rollers 14 and 15 which are of hourglass configuration. These rollers are intended to eliminate the slackness of strip 12 which arises when it is cut off and from the intermittent feeding of the rubber sheet. Of the rollers 14 and 15 the one (15) freely rotates around a fixed shaft 16 while the other is freely rotating around a shaft 17 which may be turned independently, remaining parallel to while swinging around the fixed shaft 16. The roller 14 thus moves up and down securing a continuous and even feeding of the strip 12 into the extruder. The driving of the feeding roller 5 is in the present device done through a pneumatic or hydraulic cylinder motor 18 with adjustable piston stroke length. However, other kinds of driving, e.g., gear driving, may of course be used instead.

Figure 1:
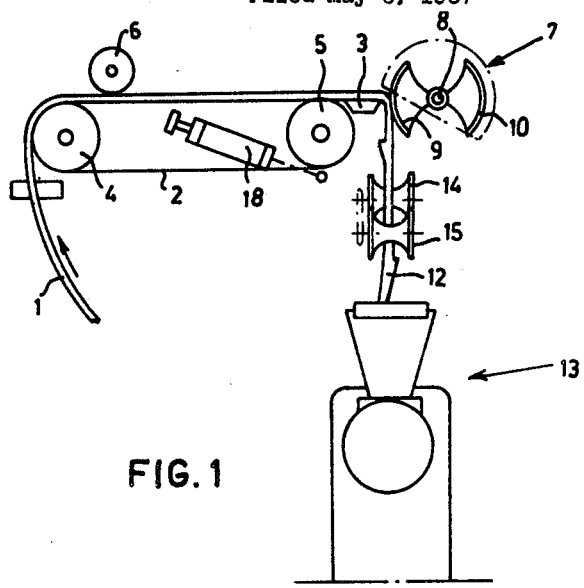
FIG. 1 is a schematic side view of the machine according to the invention.
Figure 2:
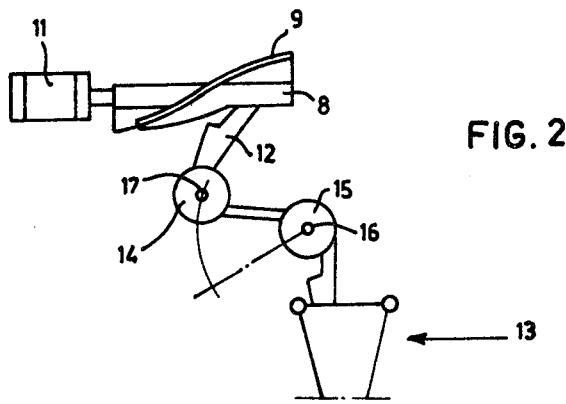
FIG. 2 is a schematic view of the machine from the right side in FIG. 1.

Referring to FIG. 1, the flow of any suitable fluid under pressure into and out of the cylinder 18 is regulated so that the piston together with its piston rod will reciprocate back and forth. The outer, right lower end of the piston rod, schematically indicated in FIG. 1, is pivotally connected to a crank arm which can freely swing around the shaft on which the roller 5 is mounted. At one of its end faces the roller 5 has ratchet teeth which coact with a pawl on the crank arm, which is urged by a spring toward the rachet teeth. In this way, when the piston rod moves to the left, so that the lever connected thereto swings in a clockwise direction as viewed in FIG. 1, roller 5 is angularly turned through a given increment, while during the reverse swinging of the crank arm which carries the pawl the latter will simply ride over the ratchet teeth with the spring yielding at this time. This is but one of many known one-way drives capable of turning the driving roller 5 through a given angular increment at each reciprocation or cycle of operation of the piston within the cylinder 18. In this way the increment of feed of the sheet 1 is determined.

With respect to the roller 14, this is simply mounted for free rotation on a pin 17 which is fixed and projects laterally from a shaft which extends from this pin to the pin 16 on which the shaft is freely swingable. In this way the roller 14 forms a "dancing" roller which can swing, for example, through the angle indicated in FIG. 1 between the horizontal attitude of the illustrated shaft interconnecting pins 16 and 17 and the inclined attitude indicated by the dot-dash line. The roller 14 simply rests by its own weight on the strip 12 so as to prevent any slack from forming in the latter. The roller 14 simply swings up and down around the shaft 16 in response to the cutting of the strip 12 and the feeding thereof to the extruder so as to eliminate slack in strip 12.

Within the idea of the invention there is room for other ways of executing the details, especially with regard to the cutting means.

It may for instance comprise one knife edge, which works first from one of the long sides of the blanket, inward and then from the other long side. Essential is that a complete cutting across the sheet is not made at each step. Nor is it necessary that the knife rotates. Instead it may work downward towards the cushion or stationary blade 3 or in another way. The length of the blades or the length of the cut-out is determined with regard to the required width of strip 12.

What is claimed is:

1. A device for obtaining a narrow strip from an elongated sheet which has a pair of opposed longitudinal side edges, comprising feeding means for feeding the sheet longitudinally in the direction of its side edges, and cutting means coacting with said feeding means for cutting transversely across the sheet first from one of said edges thereof to the region of the other side edge and, after said feeding means feeds the sheet longitudinally by a given increment, for cutting transversely across the sheet from said other side edge to the region of said one side edge, said cutting means then again cutting transversely across the sheet from said one to the region of said other side edge after said feeding means has fed the sheet through an additional increment, and so on, whereby the sheet is converted into an elongated strip.

2. The combination of claim 1 and wherein said feeding means feeds the sheet in a stepwise manner between cutting of the sheet first from one side edge and then from the other side edge by the cutting means.

3. The combination of claim 1 and wherein said cutting means has a single axis of rotation and has a pair of cutting blades one of which cuts from said one side edge of said sheet toward said other side edge and the other of which cuts from said other side edge toward said one side edge.

4. The combination of claim 3 and wherein said axis of rotation of said cutting means extends transversely with respect to the longitudinal direction of feeding of the sheet by said feeding means.

5. The combination of claim 4 and wherein a stationary cutting member forms part of said cutting means and coacts with the cutting edges which rotate about said axis, said stationary cutting member being situated beneath and supporting the sheet during the cutting thereof.

6. The combination of claim 4 and wherein the pair of cutting blades are longitudinally displaced one with respect to the other along the axis of rotation of said cutting means to situate one said cutting blade at a location for cutting from said one side edge toward but not up to the other side edge of the sheet and the other cutting blade for cutting from said other side edge toward but not up to said one side edge of the sheet.

7. The combination of claim 6 and wherein said cutting edge has a pair of opposed ends extending substantially parallel to the axis of rotation of said cutting means and has substantially the curve of a sine wave between said opposed ends.

References Cited
UNITED STATES PATENTS

| 1,116,149 | 11/1914 | Spiegel | 83—355 |
| 1,192,132 | 7/1916 | Spiegel | 83—355 |
| 1,942,398 | 1/1934 | Fowler | 83—244 X |
| 3,264,921 | 8/1966 | Nystrand | 83—342 |

ANDREW R. JUHASZ, Primary Examiner

JAMES F. COAN, Assistant Examiner

U.S. Cl. X.R.

83—156, 355, 672

Notice of Adverse Decision in Interference

In Interference No. 98,627 involving Patent No. 3,503,289, J. I. R. Friberg, DEVICE FOR CUTTING A CONTINUOUS STRIP FROM AN ELONGATED SHEET, final judgment adverse to the patentee was rendered Oct. 15, 1975, as to claims 1, 2, 3, 4, 6 and 7.

[*Official Gazette February 10, 1976.*]